United States Patent
Goebels et al.

(10) Patent No.: US 7,743,712 B2
(45) Date of Patent: Jun. 29, 2010

(54) TWO COUPLED VEHICLES SUCH AS RAILBOUND VEHICLES OR ARTICULATED BUSSES, WITH A CONNECTION WITH AT LEAST ONE BELLOWS AS WELL AS ONE COUPLING DEVICE, COMPRISING TWO COUPLING ELEMENTS

(75) Inventors: Andrè Goebels, Kassel (DE); Hans-Jakob Rudolph, Bad Emstal (DE)

(73) Assignee: Hübner GmbH, Kassel (DE)

( * ) Notice: Subject to any disclaimer, the term of this patent is extended or adjusted under 35 U.S.C. 154(b) by 128 days.

(21) Appl. No.: 12/157,228

(22) Filed: Jun. 9, 2008

(65) Prior Publication Data
US 2008/0307999 A1 Dec. 18, 2008

(30) Foreign Application Priority Data
Jun. 14, 2007 (EP) ................... 07011654

(51) Int. Cl.
*B60D 5/00* (2006.01)
(52) U.S. Cl. .......................................... 105/8.1; 105/10
(58) Field of Classification Search .................. 105/8.1, 105/9, 10, 15, 20
See application file for complete search history.

(56) References Cited

U.S. PATENT DOCUMENTS

| | | | | |
|---|---|---|---|---|
| 2,931,317 A | * | 4/1960 | Hunt | 105/10 |
| 5,487,555 A | * | 1/1996 | Koch et al. | 280/403 |
| 5,546,866 A | * | 8/1996 | Koch | 105/8.1 |
| 5,647,282 A | * | 7/1997 | Goebels | 105/18 |
| 5,823,117 A | * | 10/1998 | Ommerli | 105/8.1 |
| 6,009,813 A | * | 1/2000 | Britzke | 105/8.1 |
| 7,568,435 B2 | * | 8/2009 | Mosaner | 105/20 |
| 2008/0307999 A1 | * | 12/2008 | Goebels et al. | 105/10 |

FOREIGN PATENT DOCUMENTS

| | | |
|---|---|---|
| CN | 000002419125 Y | 4/2000 |
| EP | 0 418 594 | 3/1989 |
| EP | 0 329 031 | 8/1989 |
| EP | 1 702 829 | 9/2006 |
| FR | 2 858 287 | 7/2003 |
| WO | 96/36519 | 11/1996 |

* cited by examiner

*Primary Examiner*—S. Joseph Morano
*Assistant Examiner*—Jason C Smith
(74) *Attorney, Agent, or Firm*—Thomas R. Vigil

(57) ABSTRACT

The invention is directed to two coupled vehicles (1) such as railbound vehicles or articulated busses, with a connection with at least one bellows (2) as well as with a coupling device comprising two coupling frames (4, 5), said coupling frames (4, 5) comprising interengaging male and female coupling members (10, 15), a locking member (30) being provided for respectively locking the male coupling members (15) in the female coupling members (10), said locking member (30) being slidably guided by the respective locking member (4, 5), said locking member (30) communicating with a force transmitting member (9) that is slidably guided in the respective one of the coupling frames (4, 5), the force transmitting member (9) transmitting both tensile and shear forces.

11 Claims, 7 Drawing Sheets

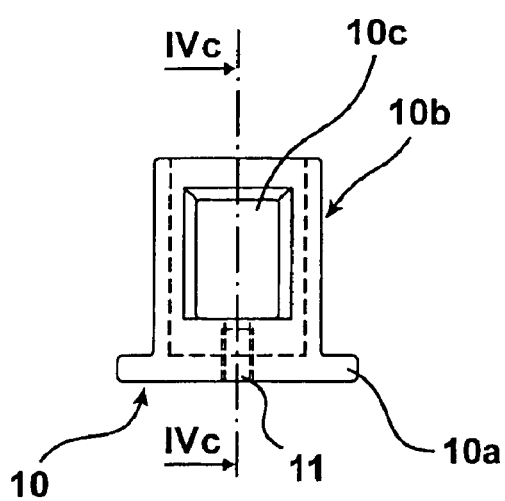
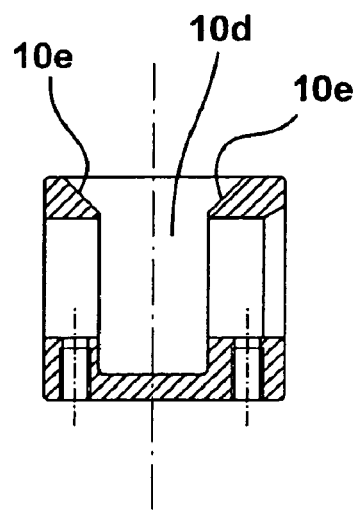
Fig. 4a
Fig. 4c
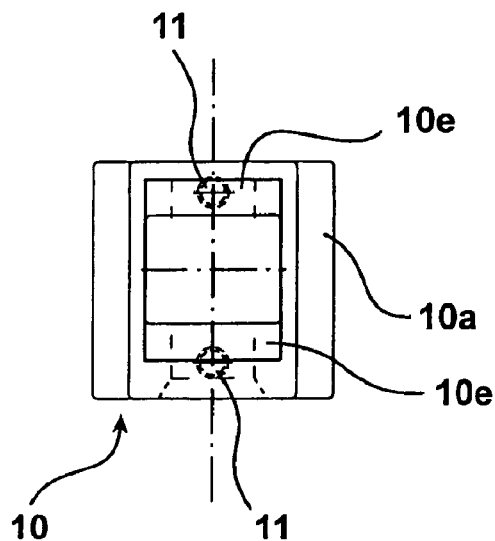
Fig. 4b

TWO COUPLED VEHICLES SUCH AS RAILBOUND VEHICLES OR ARTICULATED BUSSES, WITH A CONNECTION WITH AT LEAST ONE BELLOWS AS WELL AS ONE COUPLING DEVICE, COMPRISING TWO COUPLING ELEMENTS

CROSS-REFERENCE TO RELATED APPLICATIONS

This application claims Priority from German Application No. EP 07011654.6 filed on 14 Jun. 2007

1. Field of the Invention

The present invention relates to two coupled vehicles such as railbound vehicles or articulated busses, with a connection with at least one bellows as well as with a coupling device comprising two coupling elements.

On coupled vehicles such as railbound vehicles or articulated busses, what is referred to as a connection is provided between the discrete vehicles parts. Purely conceptually, such a connection comprises a gangway for allowing passengers to transit between one vehicle part and the other as well as a bellows with an approximately rectangular cross section that encloses at least the gangway, in most cases however also the hinge connection through which the two vehicle parts are connected together.

2. Description of the Prior Art

To fasten the bellows to the front side of the vehicle, it is known from EP 1 702 829 A1 to provide at the front side of the vehicle a circumferential fastening frame for clampably receiving a bead disposed on the bellows. For generating the clamping force acting onto the bead, clamping levers disposed on the fastening frame are provided which, after having been pivoted, keep the bead of the bellows pressed within the fastening frame.

Referring to the connection of the two vehicle parts through the bellows, there exist three different embodiments. According to a first embodiment, there is provided that the bellows is disposed directly at the front side of the car body of the one vehicle parts, both the bellows at its end and the car body comprising one coupling frame each, through which the connection is realized. It may however also be envisaged that the end wall of the vehicle forms the coupling frame. According to another embodiment, the bellows is divided in two parts, both parts of the bellows each comprising at their facing front ends one coupling frame, the two coupling frames being also adapted to be connected together.

The present invention relates to all afore mentioned embodiments.

The connection between two coupling frames is known from prior art, e.g., from U.S. Pat. No. 2,931,317 but in particular from EP 0 329 031 B1 and also from EP 0 418 594 B1. It is known from U.S. Pat. No. 2,931,317 to provide pins at the front side of the bellows, said pins being introduced into corresponding receiving receptacles at the front side of the vehicle. The pins are retained in the corresponding receiving receptacles by the action of a spring. On the prior art frames to be coupled according to EP 0 418 594 B1, alternating hooks and eyes are provided, the hooks being connected together through a circumferential wire that may be actuated by a lever. Actuation of the wire causes the hooks to shift and to come into engagement with the eyes of the opposite coupling frame. Moreover, the two coupling frames comprise interengaging pins or pin receptacles that serve on the one side to center the two coupling frames relative to each other but also ensure on the other side that the two coupling frames are not relatively movable when they are in the interconnected condition. This known device for coupling two coupling frames is very expensive due to the great number of different component parts. What matters is however not only the great number of different discrete component parts but also the mere number of component parts needed to couple two coupling frames. The greater the number of discrete component parts, the greater the weight. In the field of busses in particular, it should be kept in mind that the constructions must be light since the axle load cannot be exceeded.

BRIEF DESCRIPTION OF THE INVENTION

It is therefore the object of the invention to provide a coupling device of the type mentioned herein above that comprises two coupling elements, and in our case in particular two coupling frames, that only requires a small number of different parts and additionally has a lower weight than in prior art.

As a solution to this object, the invention proposes on two coupled vehicles having a connection and at least one bellows as well as a coupling device with two coupling elements that the coupling elements comprise interengaging male and female coupling members, a locking member being provided for respectively locking the male coupling members in the female coupling members, said locking member being slidably guided by the respective locking member, said locking member communicating with a force transmitting member that is slidably guided by the coupling element, the force transmitting member transmitting both tensile and shear forces. The coupling element may hereby be a coupling frame so that, in the case of two bellows halves, the connection is performed by coupling two coupling frames.

On a unitary bellows, according to another variant, a coupling frame is disposed as a coupling element at the front side of the bellows end, the front side of the car body having an additional corresponding coupling frame. Finally, the coupling element may be the end wall of the car body or of the vehicle. This means that the male and/or female coupling members are directly disposed on the end wall of the vehicle.

It is obvious therefrom that, except for the two coupling frames, the construction chosen only substantially comprises four different component parts, namely male and female coupling members, a locking member and a force transmitting member. This is due to the fact that the male and female coupling members that may be brought to interengage and may also be interlocked by the locking member, perform two functions. One function is centering insofar as these two members engage into each other before they are locked together and the other function is locking, which is their actual function. This means that through the interlock between the male coupling members and the female coupling members, both forces parallel to the longitudinal axis of the vehicle and forces transverse to the longitudinal axis of the vehicle may be transmitted, i.e., that the male and female coupling members prevent a movement of the thus connected coupling frames in the locked position.

Advantageous features and embodiments of the invention will become apparent from the dependent claims.

In this context, there is more specifically provided that the coupling element, in the form of a coupling frame for example, comprises a groove for receiving the force transmitting member and the locking member, the female coupling member being disposed in the region of the groove so that the locking member may be introduced into the female coupling member in order to lock the male coupling member in the female coupling member. It is obvious therefrom that, when the two coupling members are locked together, the locking member causes an interlock between the two coupling members in all the three directions in space.

According to a particular feature of the invention, there is provided that the force transmitting member is disposed for free movement in the groove of the coupling element or of the coupling frame. Free movement means in this context that the force transmitting member only lies in the groove but is free to move at its ends, meaning that it is not fixed in any way in the groove at one end. This means that complex Bowden cable constructs as they are partially needed in prior art are not needed here. This is substantially due to the fact that the force transmitting member is configured to be rigid and still highly flexible, meaning that it is made for example from spring steel or from glass fiber reinforced plastic and that it is thus capable of transmitting both tensile and pressure forces. In this context, there is particularly provided that two force transmitting members are disposed each for free movement in the circumferential groove of the coupling frame in the direction of their longitudinal axis. This means that the force transmitting member needs not necessarily surround the entire perimeter e.g., in an approximately rectangular coupling frame, but that for example two such force transmitting members, which are diagonally opposite, are placed in the groove of the coupling frame and ensure the movement of the locking members. This offers the advantage that each force transmitting member needs only extend about one corner of e.g., the coupling frame and not about all four corners as this would be the case if the force transmitting member were to extend over the entire perimeter of the coupling frame. This permits to strongly minimize the friction in the region of the groove, in particular in the corner region, thus substantially facilitating actuation for unlocking or locking.

The locking member performing the interlock between the male and the female coupling member is connected to the force transmitting member, e.g., a rod of spring steel or of glass fiber reinforced plastic material, through a clamp connection. The locking member may hereby consist of two disk-shaped plates which comprise a groove on their faces turned toward each other, said groove serving to receive the force transmitting member. Connection of the two plates permits to frictionally secure the locking member to the force transmitting member.

As already discussed herein above, the male and the female coupling member also perform the function of centering when two coupling frames are for example coupled together. In this context, there is particularly provided that the female coupling member comprises an inclined portion for the male coupling member to engage into it. Advantageously though, the male coupling member, which comprises a locking bolt for receiving the female coupling member, also has a tip in the region of the free end of the locking bolt. The locking bolt itself further also comprises an opening for receiving the locking member.

For actuating the force transmitting member, a lever that is disposed at the coupling frame or at the coupling element and that communicates with the force transmitting member is provided.

The invention will be discussed in closer detail herein after by way of example with reference to the drawings.

BRIEF DESCRIPTION OF THE DRAWINGS

FIG. 4a shows the female coupling member in a side view;

FIG. 4b shows a view from the top of the female coupling member;

FIG. 4c shows another view of the female coupling member;

FIG. 5b shows another view of the locking member according to FIG. 5a;

DETAILED DESCRIPTION OF THE INVENTION

Figure 1:
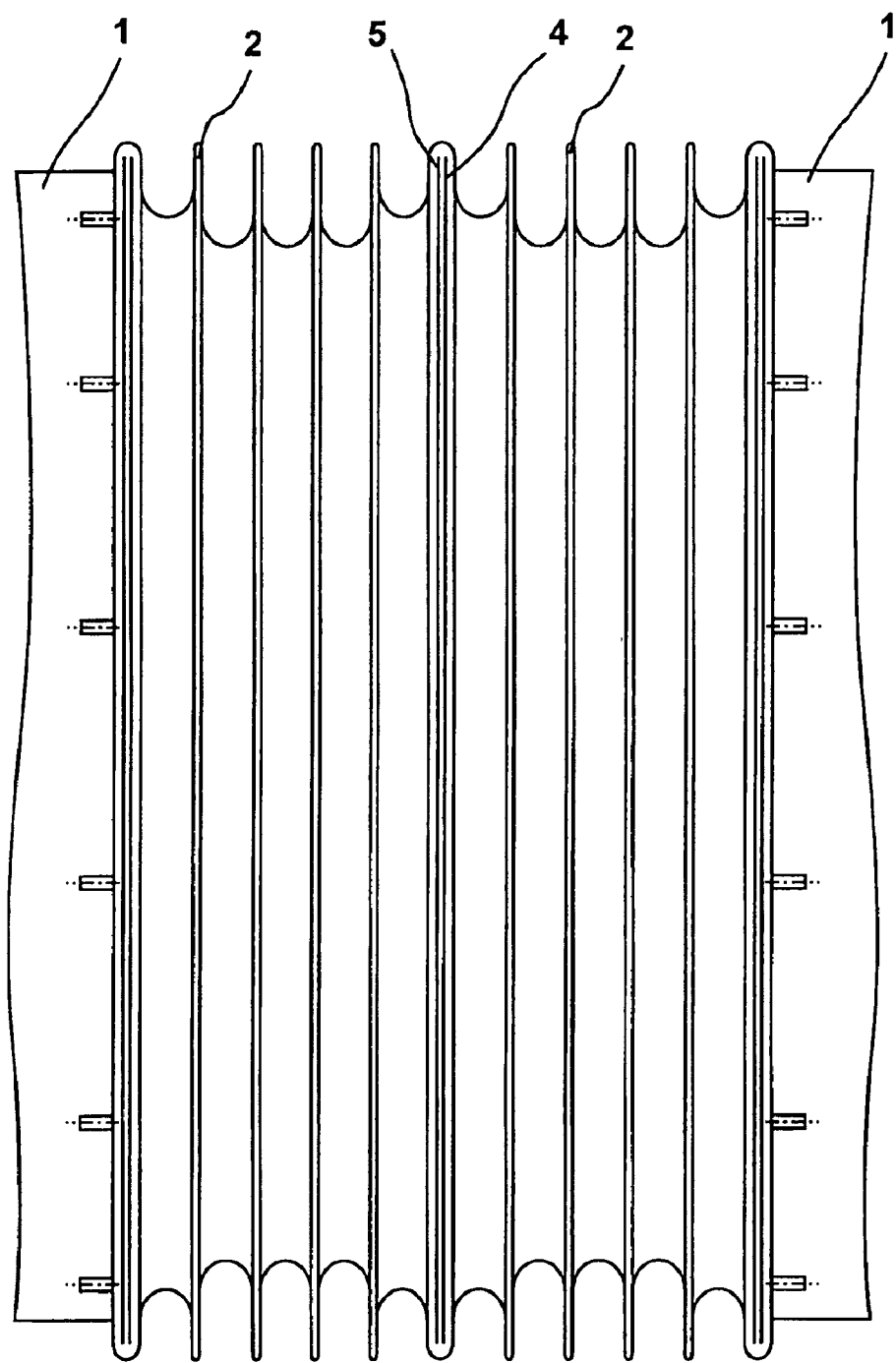
FIG. 1 schematically shows a connection between two bellows halves through two coupling frames between two vehicle parts in a side view.

Referring to FIG. 1, the two vehicle parts are indicated at 1, the bellows consisting of two halves 2 being interposed between the two vehicle parts. The two bellows halves 2 each comprise at their front side ends that are turned toward each other one coupling frame 4, 5 through which the two bellows halves 2 may be coupled together.

It is desired to explicitly note here that the invention also comprises an embodiment in which the bellows is directly coupled to the car body, meaning that a coupling frame is solidly mounted in particular to the car body, said coupling frame being adapted for coupling to the coupling frame of the bellows or to the end wall of the car body forming the coupling frame.

Figure 2:
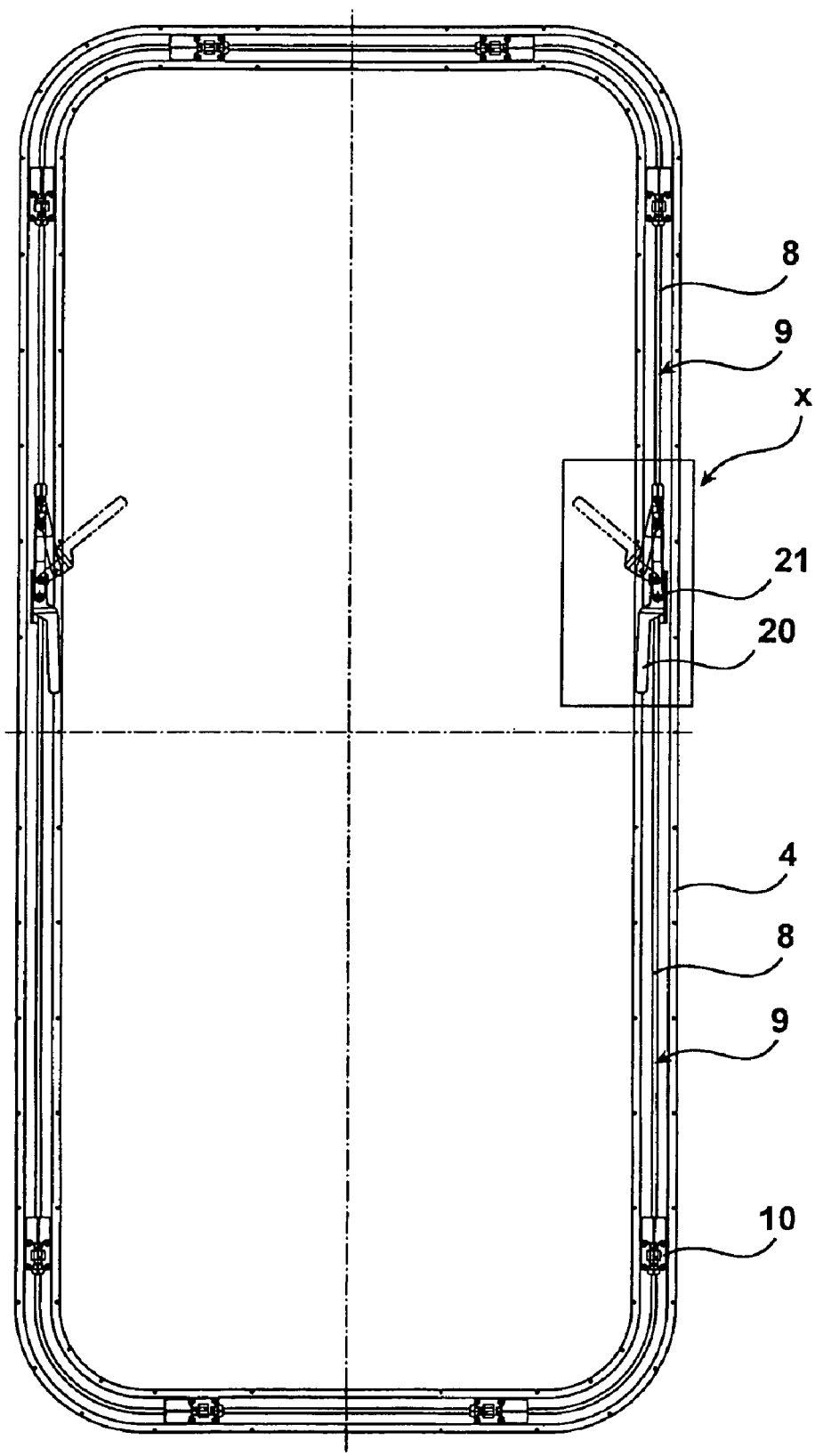
FIG. 2 shows a front view of a coupling frame.
Figure 3A:
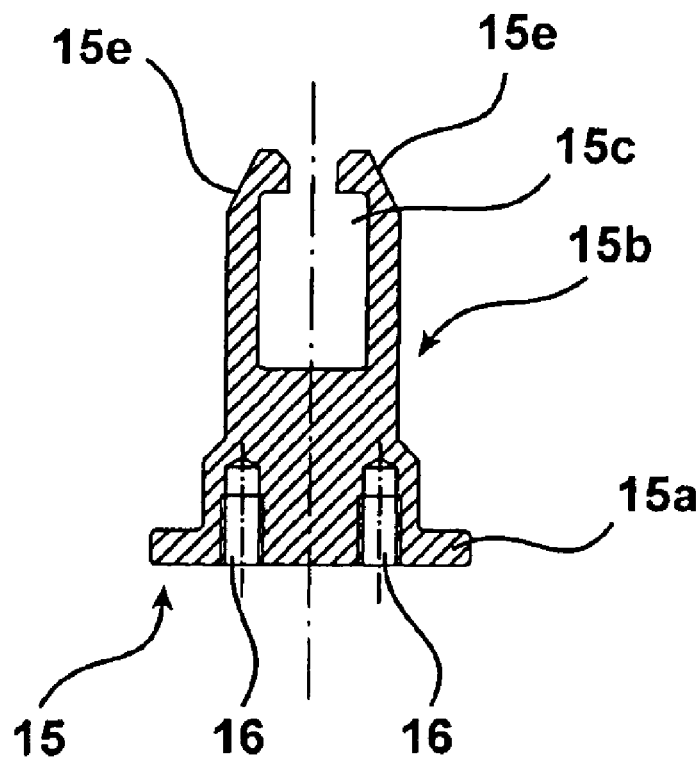
FIG. 3a shows the male coupling member in a side view.
Figure 3B:
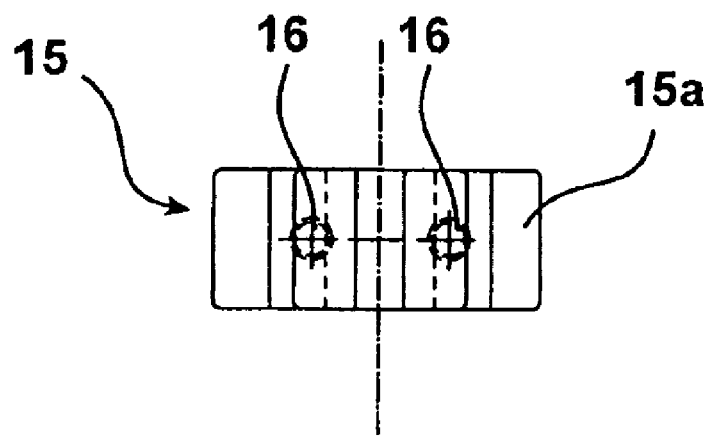
FIG. 3b shows a view from the top of the male coupling member.
Figure 7:
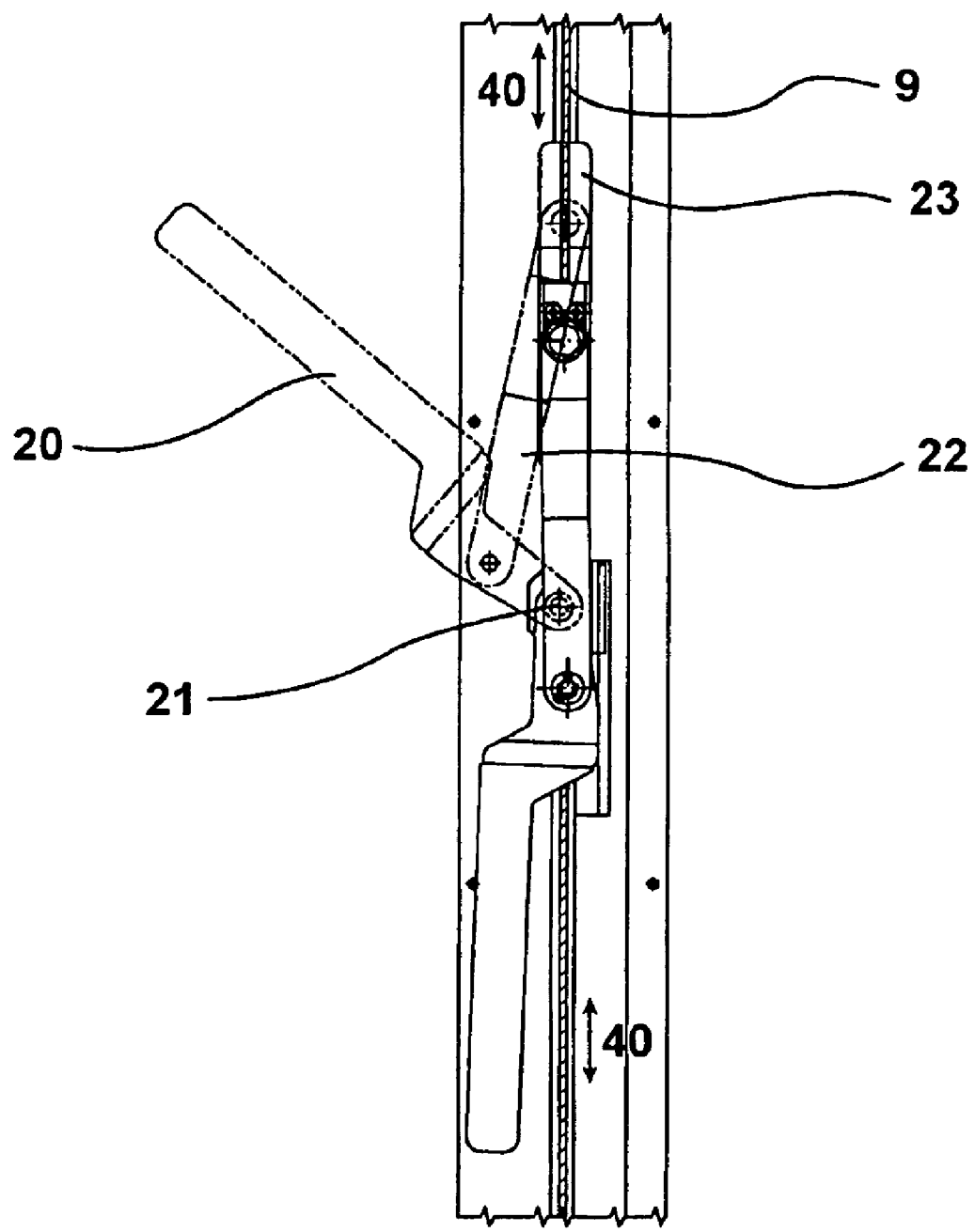
FIG. 7 shows the detail X in FIG. 2 to an enlarged scale.

The configuration of the coupling frame is visible from FIG. 2. In the present case, the coupling frame illustrated in FIG. 2 only comprises female coupling members 10 and no male coupling members 15. It is possible to combine both male and female coupling members and to dispose them on a coupling frame or, like shown in FIG. 2, to only dispose one sort of coupling members on a coupling frame. The female coupling members disposed in the coupling frame 4 have—as already explained, the reference numeral 10. The provided mating male coupling members 15 are shown in the FIGS. 3a and 3b. The coupling frame 4 has a groove 8 in which the force transmitting member 9 is guided, which communicates with the locking member 30. The force transmitting member 9 is actuated by the lever 20 that is pivotally connected to the coupling frame 4 through an axle 21, as can be seen in detail in FIG. 7. The lever 20 is rotatably connected to a connecting rod 22 that is connected to a slide 23 through which the force transmitting member 9 is clampably taken hold of. By pivoting the lever—as can be seen from FIG. 7—the force transmitting member 9 is displaced pursuant to the double arrow 40.

The female coupling member 10 is shown in various views in the FIGS. 4a, 4b, 4c. The configuration of the male coupling member 15 can be seen in the FIGS. 3a and 3b. It can be seen that the female coupling member 10 has a T-shape configuration, the web 10a comprising holes 11 for receiving screws (not shown) by means of which the respective one of the female coupling members 10 may be fixed to the coupling frame 4. The female coupling member is disposed in corresponding cutouts in the groove of the coupling frame; in any case, the male coupling member 15 lies within the female coupling member 10 in such a manner that the locking member 30 located in the groove may perform the locking process.

Figure 6A:
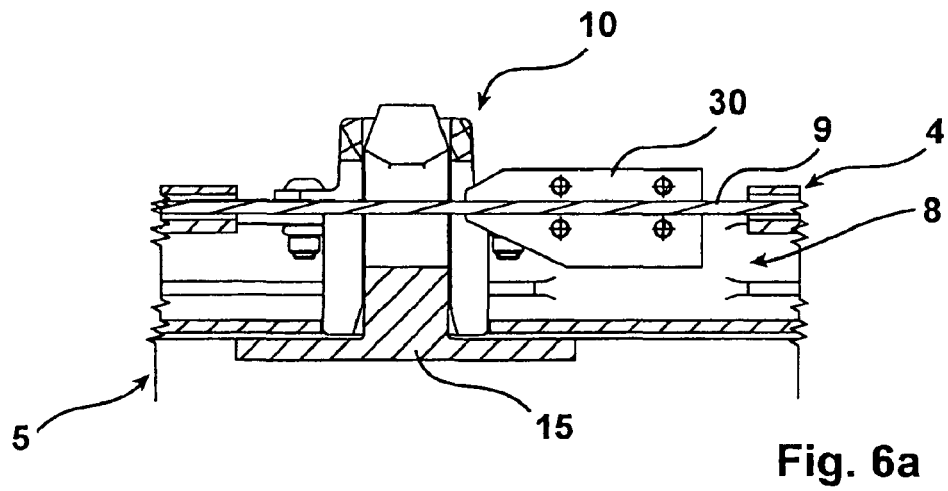
FIG. 6a shows a position in which the male coupling member is located in the female coupling member.
Figure 6B:
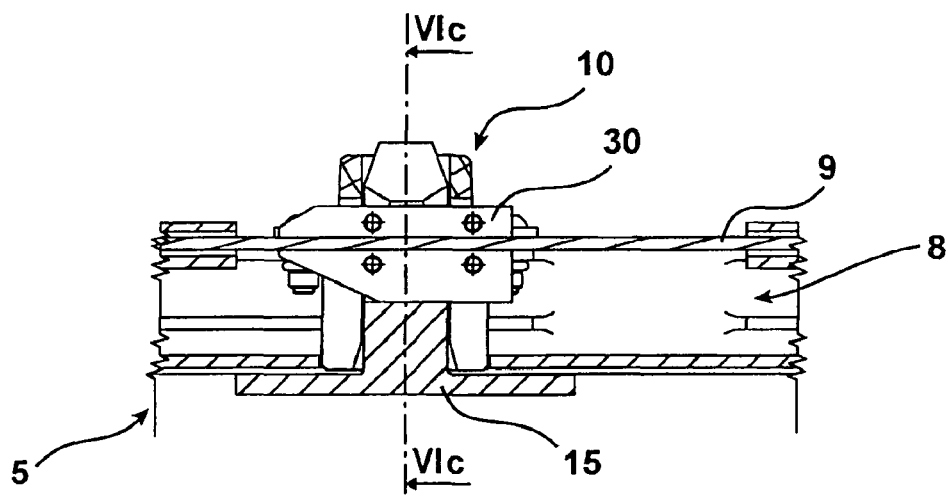
FIG. 6b shows a view according to FIG. 6a in which the locking member causes the female and the male coupling member to interlock.

Referring to the FIGS. 6a, 6b, the leg 10b of the coupling member 10 has an opening 10c for receiving the locking member 30.

Figure 6C:
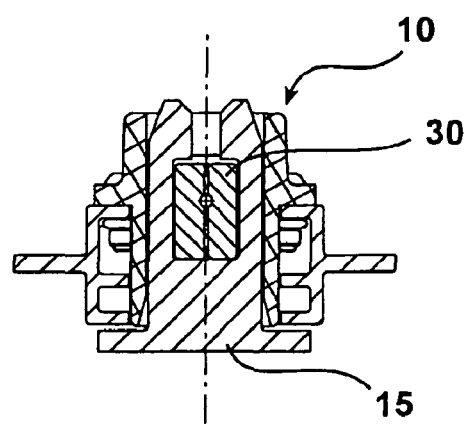
FIG. 6c shows a sectional view taken along the line VIc-VIc in FIG. 6b.

Correspondingly, the leg 15b of the also T-shaped male coupling member in the form of the locking bolt further also comprises an opening 15c that also serves to receive the locking member 30 according to the FIGS. 6a, 6b. The openings 10c and 15c are configured and arranged so as to be aligned so that the locking member 30 may engage in these two openings when the male coupling member 15 is located in the female coupling member 10 (FIGS. 6a through 6c). The male coupling member indicated at 15 in the FIGS. 3a, 3b also has a web 15a for fixation to the coupling frame 4, 5 by means of screws extending through the screw holes 16.

Figure 5A:
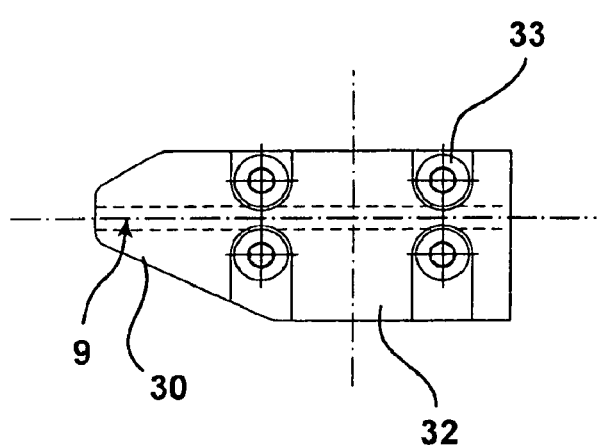
FIG. 5a shows the locking member in a side view.
Figure 5B:
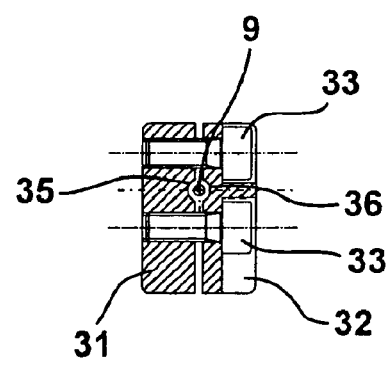

The locking member 30 comprises two plates 31, 32 that are joined together by screws 33 (FIG. 5a, FIG. 5b). On their sides facing each other, the plates 31, 32 each comprise one semi-circular groove 35, 36 that serves to receive the force transmitting member 9, said force transmitting member 9 being clampably taken hold of as a flexible rod by the two plates in the region of the groove 35, 36.

In the region of engagement 10d, the female coupling member 10 comprises four openings 10c as well as the two inclined engagement portions 10e in order to facilitate engagement of the male coupling member during centering, said male coupling member having matingly arranged inclined engagement portions 15e forming a tip.

The locking process can be seen in detail in the FIGS. 6a, 6b. FIG. 6a shows a position in which the male coupling member 15 is already located in the female coupling member 10, shortly before the locking member 30 locks the two coupling members in their openings 10c, 15c, as this can be seen in detail in FIG. 6b. FIG. 6c shows a section taken along the line VIc-VIc in FIG. 6b, this view showing in detail how the locking member 30 causes both the male and the female coupling member to lock.

We claim:

1. Two coupled vehicles, with a connection with at least one bellows as well as with a coupling device comprising two coupling frames said coupling frames comprising interengaging male and female coupling members, a locking member being provided for respectively locking the male coupling members in the female coupling members, said locking member being slidably guided by the respective coupling frames, said locking member communicating with a force transmitting member that is slidably guided in the respective one of the coupling frames, the force transmitting member transmitting both tensile and shear forces and wherein the coupling frame comprises a groove for receiving the force transmitting member and the locking member, the female coupling member being disposed in the region of the groove so that the locking member may be introduced into the female coupling member in order to lock the male coupling member in the female coupling member.

2. Two coupled vehicles as set forth in claim 1, characterized in that the force transmitting member is disposed in the groove for movement in the direction of its longitudinal axis.

3. Two coupled vehicles as set forth in claim 1, characterized in that two force transmitting members are each disposed in the a groove for movement in the direction of their longitudinal axis.

4. Two coupled vehicles as set forth in claim 1, characterized in that the force transmitting member is configured to be a flexible rod.

5. Two coupled vehicles as set forth in claim 1, characterized in that the locking member is connected to the force transmitting member through a clamp connection.

6. Two coupled vehicles as set forth in claim 1, characterized in that the female coupling member comprises an inclined engagement portion for the male coupling member to engage.

7. Two coupled vehicles as set forth in claim 1, characterized in that the male coupling member comprises a locking bolt for reception by the female coupling member, said locking bolt comprising a conically tapering tip in the region of its free end.

8. Two coupled vehicles as set forth in claim 7, characterized in that the locking bolt comprising an opening for receiving the locking member.

9. Two coupled vehicles as set forth in claim 1, characterized in that the force transmitting member is actuatable by a lever disposed on the coupling frame.

10. Two coupled vehicles as set forth in claim 1, characterized in that the coupling frame is formed by the end wall of the vehicle.

11. Two coupled vehicles, with a connection with at least one bellows as well as with a coupling device comprising two coupling frames, said coupling frames comprising interengaging male and female coupling members, a locking member being provided for respectively locking the male coupling members in the female coupling members, said locking member being slidably guided by the respective frame member, said locking member communicating with a force transmitting member that is slidably guided in the respective one of the coupling frames, the force transmitting member transmitting both tensile and shear forces, and wherein two force transmitting members are each disposed in a groove for movement in the direction of their longitudinal axis.

* * * * *